(12) United States Patent
Kuribara et al.

(10) Patent No.: US 10,099,571 B2
(45) Date of Patent: Oct. 16, 2018

(54) CONTROL DEVICE AND CONTROL METHOD FOR VEHICLE

(71) Applicant: Toyota Jidosha Kabushiki Kaisha, Toyota-shi, Aichi-ken (JP)

(72) Inventors: Fumiyoshi Kuribara, Toyota (JP); Shigetaka Asano, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 43 days.

(21) Appl. No.: 15/463,694

(22) Filed: Mar. 20, 2017

(65) Prior Publication Data

US 2017/0274797 A1 Sep. 28, 2017

(30) Foreign Application Priority Data

Mar. 22, 2016 (JP) .................................. 2016-057024

(51) Int. Cl.
*B60L 11/18* (2006.01)
*H02J 7/00* (2006.01)

(52) U.S. Cl.
CPC ....... *B60L 11/1868* (2013.01); *B60L 11/1809* (2013.01); *B60L 11/1862* (2013.01); *H02J 7/0021* (2013.01)

(58) Field of Classification Search
CPC .............. B60L 11/1811; B60L 11/1875; B60L 2210/10; H02J 7/022; H02J 7/0052
USPC ........................................... 701/22; 320/109
See application file for complete search history.

(56) References Cited

U.S. PATENT DOCUMENTS

| 9,748,777 | B2* | 8/2017 | Owen | H02J 7/0021 |
|---|---|---|---|---|
| 9,812,895 | B2* | 11/2017 | Kawamura | H02J 7/14 |
| 9,969,253 | B2* | 5/2018 | West | B60K 6/22 |
| 2010/0078993 | A1* | 4/2010 | Ichikawa | B60L 3/003 307/10.1 |
| 2015/0210181 | A1* | 7/2015 | Niioka | H01M 10/48 701/22 |
| 2017/0036559 | A1* | 2/2017 | Murasato | B60L 11/1844 |
| 2017/0197511 | A1* | 7/2017 | Yonak | B60L 11/1803 |
| 2017/0274783 | A1* | 9/2017 | Kuribara | B60L 11/1811 |
| 2017/0274797 | A1* | 9/2017 | Kuribara | B60L 11/1868 |
| 2017/0334420 | A1* | 11/2017 | Kato | B60K 6/365 |
| 2017/0334424 | A1* | 11/2017 | Kato | B60W 20/11 |
| 2017/0346412 | A1* | 11/2017 | Lei | B60K 6/365 |
| 2017/0349157 | A1* | 12/2017 | Hokoi | B60K 6/445 |
| 2017/0349160 | A1* | 12/2017 | Kato | B60W 20/11 |
| 2018/0029474 | A1* | 2/2018 | Berels | B60L 3/0092 |
| 2018/0072183 | A1* | 3/2018 | Nomura | B60L 11/1875 |

FOREIGN PATENT DOCUMENTS

| JP | 2011-259612 A | 12/2011 |
|---|---|---|
| JP | 2013-146184 A | 7/2013 |
| WO | 2013/098904 A1 | 7/2013 |

* cited by examiner

*Primary Examiner* — Thomas G Black
*Assistant Examiner* — Wae L Louie
(74) *Attorney, Agent, or Firm* — Dinsmore & Shohl LLP

(57) ABSTRACT

In a low power charging mode, when a predetermined time has elapsed from the start of external charging, the external charging ends. With this, it is possible to suppress excessive extension of a power feeding time from an external power supply, and to secure a charging amount of a high voltage battery at least to some extent.

3 Claims, 3 Drawing Sheets

CONTROL DEVICE AND CONTROL METHOD FOR VEHICLE

CROSS-REFERENCE TO RELATED APPLICATIONS

This application claims priority to Japanese Patent Application No. 2016-057024 filed on Mar. 22, 2016 which is incorporated herein by reference in its entirety including the specification, drawings and abstract.

BACKGROUND

1. Technical Field

The present disclosure relates to a vehicle, and in particular, to a control device and a control method for a vehicle with a motor, a high voltage battery, a charger, and two DC-DC converters.

2. Description of Related Art

Hitherto, as such a kind of vehicle, a vehicle provided with a motor for traveling, an assembled battery connected to the motor through a first power line, a charger connected to the first power line and configured to charge the assembled battery using electric power from an external power supply, an accessory battery connected to a second power line, a first DC-DC converter configured to supply electric power of the first power line to the second power line with decreasing a voltage, and a second DC-DC converter incorporated in the charger and configured to supply electric power of the first power line to the second power line with decreasing a voltage has been suggested (for example, see International Publication No. 2013-098904 (WO 2013-098904 A)).

SUMMARY

In the above-described vehicle, when electric power from the external power supply is comparatively small, the execution time of external charging for charging the assembled battery with the charger using electric power from the external power supply may be excessively extended. When electric power from the external power supply is comparatively small and electric power supplied to the second power line by the first DC-DC converter or the second DC-DC converter is comparatively large, the charged electric power of the assembled battery may temporarily become comparatively small (for example, becomes near zero or minus). For this reason, in a case of a specification in which drive of the charger is stopped when charged electric power of the assembled battery becomes comparatively small even before charging of the assembled battery is completed, the charging amount of the assembled battery may not be secured sufficiently.

A control device for a vehicle of the disclosure suppresses excessive extension of a power feeding time from an external power supply when electric power from the external power supply is comparatively small and secures a charging amount of a high voltage battery at least to some extent.

An example aspect of the present disclosure includes a control device for a vehicle. The vehicle includes a motor for traveling, a high voltage battery connected to the motor through a high voltage system power line, a charger connected to the high voltage system power line, the charger being configured to charge the high voltage battery using electric power from an external power supply, a low voltage battery connected to a low voltage system power line, a first DC-DC converter connected to the high voltage system power line and the low voltage system power line, the first DC-DC converter configured to decrease a voltage of the high voltage system power line and to supply the electric power of the high voltage system power line to the low voltage system power line, and a second DC-DC converter connected to the high voltage system power line closer to the charger than the first DC-DC converter and the low voltage system power line, the second DC-DC converter configured to decrease a voltage of the high voltage system power line and to supply electric power of the high voltage system power line to the low voltage system power line. The control device includes an electronic control unit configured to i) control the charger by the electronic control unit such that an power storage ratio of the high voltage battery becomes a target ratio when the charger performs external charging for charging the high voltage battery using the electric power from the external power supply, and ii) end the external charging when predetermined time has elapsed from the start of the external charging and when electric power from the external power supply is equal to or less than predetermined electric power. An example aspect of the present disclosure includes a control method for a vehicle, the vehicle including a motor for traveling, a high voltage battery connected to the motor through a high voltage system power line, a charger connected to the high voltage system power line, the charger being configured to charge the high voltage battery using electric power from an external power supply, a low voltage battery connected to a low voltage system power line, a first DC-DC converter connected to the high voltage system power line and the low voltage system power line, the first DC-DC converter configured to decrease a voltage of the high voltage system power line and to supply the electric power of the high voltage system power line to the low voltage system power line, a second DC-DC converter connected to the high voltage system power line closer to the charger than the first DC-DC converter and the low voltage system power line, the second DC-DC converter configured to decrease a voltage of the high voltage system power line and to supply electric power of the high voltage system power line to the low voltage system power line, and an electronic control unit. The control method includes i) controlling the charger by the electronic control unit such that an power storage ratio of the high voltage battery becomes a target ratio when the charger performs external charging for charging the high voltage battery using electric power from the external power supply, and ii) ending the external charging by the electronic control unit when a predetermined time has elapsed from the start of the external charging and when electric power from the external power supply is equal to or less than a predetermined electric power.

In the control device for a vehicle of the disclosure, when electric power from the external power supply is equal to or less than the predetermined electric power and when the power storage ratio of the high voltage battery reaches the target ratio or the predetermined time has elapsed from the start of the external charging, the external charging ends. Therefore, the execution time of the external charging is made to be equal to or less than the predetermined time, it is possible to suppress excessive extension of the power feeding time from the external power supply. Furthermore, the external charging is executed (continued) until the power storage ratio of the high voltage battery reaches the target ratio or the predetermined time has elapsed from the start of the external charging, whereby it is possible to secure the charging amount of the high voltage battery at least to some extent compared to a case where the external charging ends instantly when the charged electric power of the high voltage battery temporarily becomes comparatively small (for example, becomes near zero or minus).

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Next, a mode for carrying out the disclosure will be described in connection with an example.

Figure 1:
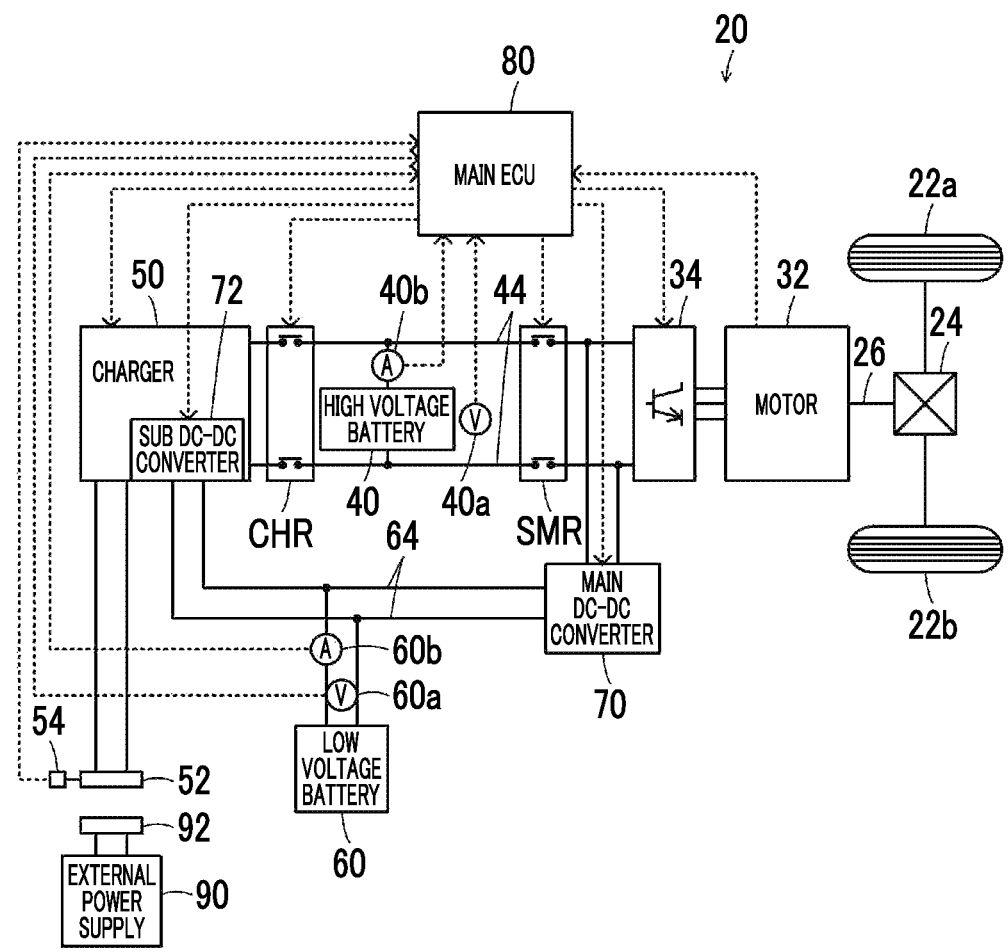
FIG. 1 is a configuration diagram showing the outline of the configuration of an electric vehicle as an example of the disclosure.

FIG. 1 is a configuration diagram showing the outline of the configuration of an electric vehicle 20 as an example of the disclosure. As shown in the drawing, the electric vehicle 20 of the example is provided with a motor 32, an inverter 34, a high voltage battery 40, a charger 50, a low voltage battery 60, a main DC-DC converter 70, a sub DC-DC converter 72, a system main relay SMR, a charging relay CHR, and a main electronic control unit (hereinafter, referred to as a "main ECU") 80.

The motor 32 is constituted as, for example, a synchronous motor generator, and is connected to a drive shaft 26 coupled to drive wheels 22*a*, 22*b* through a differential gear 24. The inverter 34 is used for driving the motor 32, and is connected to a high voltage system power line 44. The motor 32 is rotationally driven through switching control of a plurality of switching elements (not shown) of the inverter 34 by the main ECU 80. The high voltage battery 40 is constituted as, for example, a lithium-ion secondary battery or a nickel-hydrogen secondary battery having a rated voltage of 200 V, 250 V, 300 V, or the like, and is connected to the inverter 34 through the high voltage system power line 44 as described above.

The charger 50 is connected to the high voltage system power line 44 and is configured to charge the high voltage battery 40 using electric power from an external power supply 90 when a vehicle-side connector 52 is connected to an power supply-side connector 92 of the external power supply 90. The charger 50 supplies electric power from the external power supply 90 to the high voltage battery 40 side under the control of the main ECU 80 when the vehicle-side connector 52 is connected to the power supply-side connector 92.

The low voltage battery 60 is constituted as, for example, a lead storage battery having a rated voltage of 12 V or the like, and is connected to a low voltage system power line 64. A plurality of accessories, such as a headlight, a room lamp, an audio system, a power window, and a seat heater, and an electronic control unit, such as the main ECU 80, are also connected to the low voltage system power line 64.

The main DC-DC converter 70 is connected to the high voltage system power line 44 and the low voltage system power line 64. The main DC-DC converter 70 supplies the electric power of the high voltage system power line 44 to the low voltage system power line 64 with decreasing a voltage under the control of the main ECU 80.

The sub DC-DC converter 72 is constituted as a DC-DC converter having a rated output smaller than that of the main DC-DC converter 70. The sub DC-DC converter 72 is connected to the high voltage system power line 44 on the charger 50 side from the main DC-DC converter 70 and the low voltage system power line 64. In the example, it is assumed that the sub DC-DC converter 72 is incorporated in the charger 50. The sub DC-DC converter 72 supplies the electric power of the high voltage system power line 44 to the low voltage system power line 64 with decreasing a voltage under the control of the main ECU 80.

The system main relay SMR is provided between the high voltage battery 40 and the inverter 34 or the main DC-DC converter 70 in the high voltage system power line 44, and is turned on and off to connect or release the connection of the high voltage battery 40 side and the inverter 34 or the main DC-DC converter 70 side under the control of the main ECU 80.

The charging relay CHR is provided between the high voltage battery 40 and the charger 50 or the sub DC-DC converter 72 in the high voltage system power line 44, and is turned on and off to connect or release the connection of the high voltage battery 40 side and the charger 50 or the sub DC-DC converter 72 side under the control of the main ECU 80.

Though not shown, the main ECU 80 is constituted as a microprocessor centering on a control processing unit (CPU), and is provided with, in addition to the CPU, a read only memory (ROM) which stores a processing program, a random access memory (RAM) which temporarily stores data, an input-output port, and the like. To the main ECU 80, signals from various sensors are input through the input port.

As the signals which are input to the main ECU 80, for example, a rotation position of a rotor of the motor 32 from a rotation position sensor configured to detect the rotation position of the rotor of the motor 32, a voltage Vb1 from a voltage sensor 40*a* attached between terminals of the high voltage battery 40, a current Ib1 from a current sensor 40*b* attached to an output terminal of the high voltage battery 40, and the like can be exemplified. Signals from various sensors attached to the charger 50, a connection signal from a connection switch 54 attached to the vehicle-side connector 52 and configured to determine whether or not the vehicle-side connector 52 and the power supply-side connector 92 of the external power supply 90 are connected, and the like can also be exemplified. Furthermore, a voltage Vb2 from a voltage sensor 60*a* attached between terminals of the low voltage battery 60, a current Ib2 from a current sensor 60*b* attached to an output terminal of the low voltage battery 60, and the like can also be exemplified. In addition, an ignition signal from an ignition switch, a shift position SP from a shift position sensor, an accelerator pedal angle from an accelerator pedal position sensor, a brake pedal position from a brake pedal position sensor, a vehicle speed from a vehicle speed sensor, and the like can also be exemplified.

From the main ECU 80, various control signals are output through the output port. As the signals which are output from the main ECU 80, for example, a switching control signal to a plurality of switching elements of the inverter 34, a control signal to the charger 50, control signals to a plurality of accessories, a control signal to the main DC-DC converter 70, a control signal to the sub DC-DC converter 72, a control signal to the system main relay SMR, a control signal to the charging relay CHR, and the like can be exemplified.

The main ECU 80 calculates an power storage ratio SOC1 of the high voltage battery 40 based on an integrated value of the current Ib1 of the high voltage battery 40 from the current sensor 40b, or calculates an power storage ratio SOC2 of the low voltage battery 60 based on an integrated value of the current Ib2 of the low voltage battery 60 from the current sensor 60b.

In the electric vehicle 20 of the example configured as above, when the vehicle is parked at home or a charging point, such as a charging station, if the vehicle-side connector 52 and the power supply-side connector 92 of the external power supply 90 are connected, the main ECU 80 turns on the charging relay CHR to perform control such that the charger 50 charges the high voltage battery 40 using electric power from the external power supply 90. Hereinafter, charging of the high voltage battery 40 by the charger 50 using electric power from the external power supply 90 is referred to as "external charging".

At the time of the external charging, main ECU 80 drives the sub DC-DC converter 72 to perform sub-power feeding processing for feeding electric power to the low voltage system power line 64 or drives the main DC-DC converter 70 to performs main power feeding processing to feed electric power to the low voltage system power line 64. In the example, in consideration of the rated output of the sub DC-DC converter 72 smaller than the rated output of the main DC-DC converter 70, when it is not necessary to supply very large electric power to the low voltage system power line 64, the sub-power feeding processing is performed, and when it is necessary to supply comparatively large electric power to the low voltage system power line 64, the main power feeding processing is performed. It is necessary to supply comparatively large electric power to the low voltage system power line 64 when it is necessary to charge the low voltage battery 60 (when the voltage Vb2 or the power storage ratio SOC2 of the low voltage battery 60 decreases to be less than a threshold). In order to perform the main power feeding processing, the system main relay SMR needs to be turned on.

Figure 2:
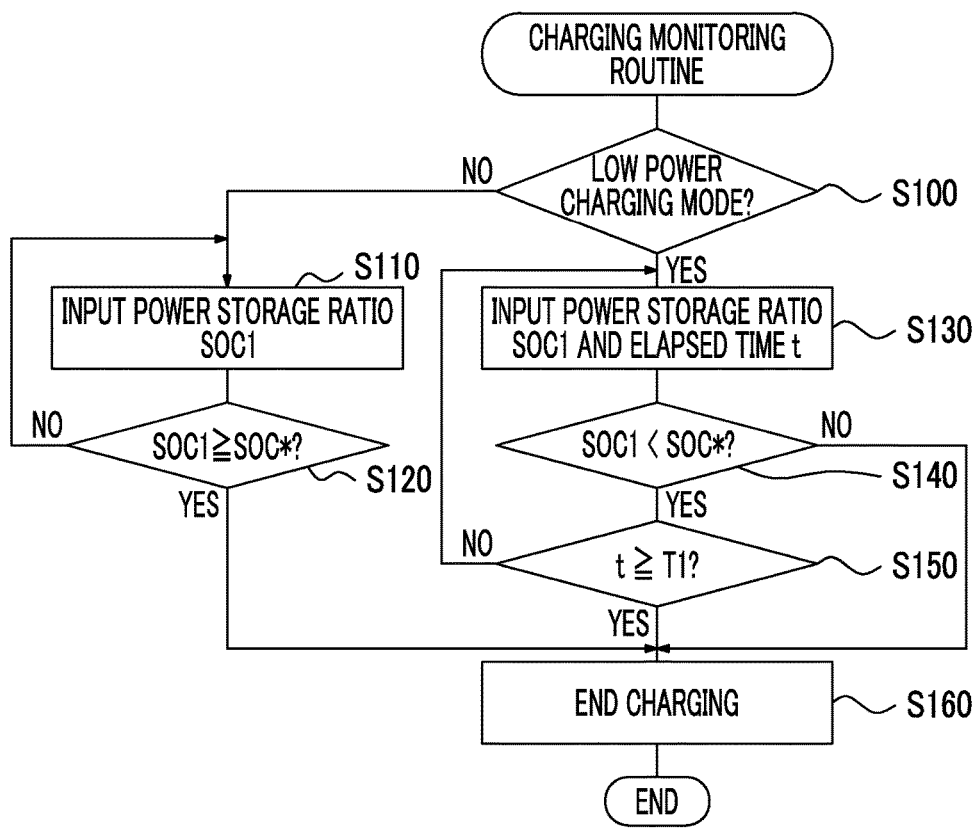
FIG. 2 is a flowchart showing an example of a charging monitoring routine which is executed by a main ECU of the example.

Next, the operation of the electric vehicle 20 of the example configured as above, in particular, the operation when monitoring the external charging will be described. FIG. 2 is a flowchart showing an example of a charging monitoring routine which is executed by the main ECU 80 of the example. This routine is executed when the external charging is started.

If the charging monitoring routine is executed, the main ECU 80 first determines whether or not a low power charging mode is executed (Step S100). In the example, supply electric power Pps from the external power supply 90 is compared with a threshold Ppsref, and when the supply electric power Pps from the external power supply 90 is greater than the threshold Ppsref, it is determined that the low power charging mode is not executed, and when the supply electric power Pps from the external power supply 90 is equal to or less than the threshold Ppsref, it is determined that the low power charging mode is executed. The supply electric power Pps from the external power supply 90 can be input from an external charging device provided with the external power supply 90 through communication and used or the input electric power of the charger 50 can be input from a charging ECU 56 as the supply electric power Pps through communication and used. In regard to the threshold Ppsref, for example, 800 W, 900 W, 1000 W, or the like can be used.

When it is determined in Step S100 that the low power charging mode is not executed, the power storage ratio SOC1 of the high voltage battery 40 is input (Step S110). In regard to the power storage ratio SOC1 of the high voltage battery 40, a value calculated based on the integrated value of the current Ib1 of the high voltage battery 40 from the current sensor 40b is input.

Then, the power storage ratio SOC1 of the high voltage battery 40 is compared with a target ratio SOC* (Step S120), and when the power storage ratio SOC1 of the high voltage battery 40 is less than the target ratio SOC*, the process returns to Step S110. Then, the processing of Steps S110 and S120 is repeatedly executed, when the power storage ratio SOC1 of the high voltage battery 40 becomes equal to or greater than the target ratio SOC* in Step S120, the external charging ends (Step S160), and this routine ends. The target ratio SOC* is determined as the power storage ratio SOC1 at which charging of the high voltage battery 40 ends, and for example, 80%, 85%, 90%, or the like can be used.

When it is determined in Step S100 that the low power charging mode is executed, the power storage ratio SOC1 of the high voltage battery 40 and an elapsed time t after the external charging in the low power charging mode starts are input (Step S130). An input method of the power storage ratio SOC1 of the high voltage battery 40 has been described above. In regard to the elapsed time t after the external charging in the low power charging mode starts, a count value of a timer which starts counting from a value 0 when the external charging in the low power charging mode starts is input.

Subsequently, the power storage ratio SOC1 of the high voltage battery 40 is compared with the target ratio SOC* (Step S140), and when the power storage ratio SOC1 of the high voltage battery 40 is less than the target ratio SOC*, the elapsed time t after the external charging in the low power charging mode starts is compared with a predetermined time T1 (Step S150). The predetermined time T1 is determined as a time which is longer to some extent than a time T2 required for increasing the power storage ratio SOC1 of the high voltage battery 40 from a comparatively low (for example, 30%, 35%, 40%, or the like) to the target ratio SOC* when the low power charging mode is not executed. For example, when 15 hours, 15.5 hours, 16 hours, or the like are used as the predetermined time T2, 22 hours, 23 hours, 24 hours, or the like can be used as the predetermined time T1.

When the power storage ratio SOC1 of the high voltage battery 40 is less than the target ratio SOC* in Step S140 and the elapsed time t after the external charging in the low power charging mode starts is less than the predetermined time T1 in Step S150, the process returns to Step S130. The processing of Steps S130 to S150 is repeatedly executed, and when the power storage ratio SOC1 of the high voltage battery 40 becomes equal to or greater than the target ratio SOC* in Step S140 or when the elapsed time t after the external charging in the low power charging mode starts becomes equal to or greater than the predetermined time T1 in Step S150 even if the power storage ratio SOC1 of the high voltage battery 40 is less than the target ratio SOC* in Step S130, the external charging ends (Step S160), and this routine ends. Accordingly, the execution time of the external charging is made to be equal to or less than the predetermined time T1, whereby it is possible to suppress excessively extension of the power feeding time from the external power supply. The external charging is executed (continued) until the power storage ratio SOC of the high voltage battery 40 reaches the target ratio SOC* or a predetermined time has elapsed from the start of the external charging, whereby it is possible to secure the charging amount of the high voltage battery 40 at least to some extent compared to a case where the external charging ends when the charged electric power of the high voltage battery 40 temporarily becomes comparatively small (for example, becomes near zero or minus).

In the electric vehicle 20 of the example described above, when the low power charging mode is executed, when the power storage ratio SOC of the high voltage battery 40 becomes equal to or greater than the target ratio SOC* or the predetermined time T1 has elapsed from the start of the external charging, the external charging ends. With this, it is possible to suppress excessive extension of the power feeding time from the external power supply, and to secure the charging amount of the high voltage battery 40 at least to some extent.

Figure 3:
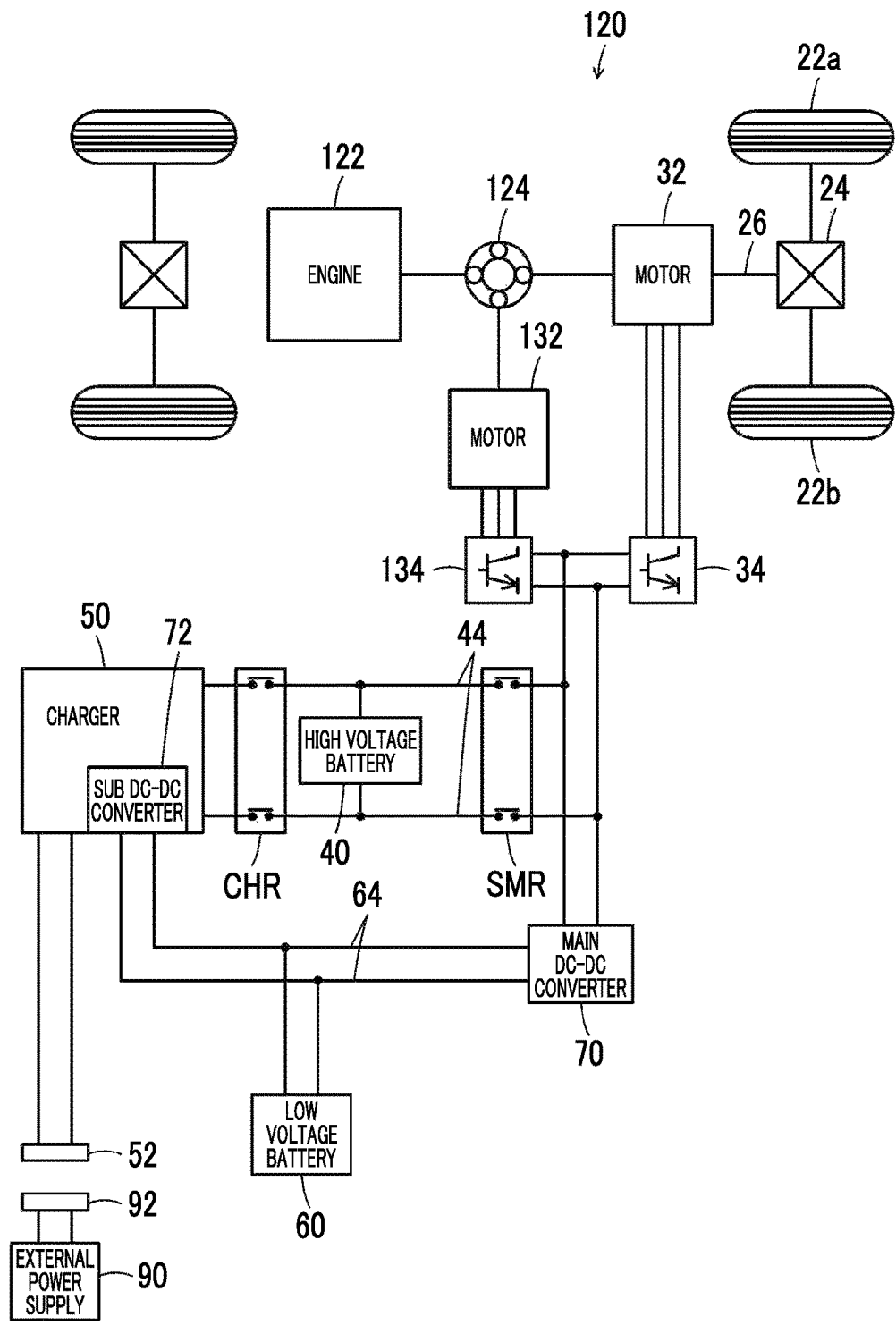
FIG. 3 is a configuration diagram showing the outline of the configuration of a hybrid vehicle of a modification example.

In the electric vehicle 20 of the example, a configuration has been made in which the motor 32, the inverter 34, the high voltage battery 40, the charger 50, the low voltage battery 60, the main DC-DC converter 70, and the sub DC-DC converter 72 are provided. However, as shown in a hybrid vehicle 120 of a modification example of FIG. 3, a configuration may be made in which, in addition to the motor 32, the inverter 34, the high voltage battery 40, the charger 50, the low voltage battery 60, the main DC-DC converter 70, and the sub DC-DC converter 72, an engine 122, a planetary gear 124, a motor 132, and an inverter 134 are provided. The motor 132 is connected to a sun gear of the planetary gear 124, the engine 122 is connected to a carrier of the planetary gear 124, and a drive shaft 26 and the motor 32 are connected to a ring gear of the planetary gear 124. The inverter 34 is used for driving the motor 132, and is connected to the high voltage system power line 44 along with the inverter 34.

The correspondence relationship between the primary components of the example and the primary components of the disclosure described in Summary will be described. In the example, the motor 32 is equivalent to a "motor", the high voltage battery 40 is equivalent to a "high voltage battery", the charger 50 is equivalent to a "charger", the low voltage battery 60 is equivalent to a "low voltage battery", the main DC-DC converter 70 is equivalent to a "first DC-DC converter", the sub DC-DC converter 72 is equivalent to a "second DC-DC converter", and the main ECU 80 is equivalent to an "electronic control unit".

The correspondence relationship between the primary components of the example and the primary components of the disclosure described in Summary should not be considered to limit the components of the disclosure described in Summary since the example is only illustrative to specifically describe the aspects of the disclosure. That is, the disclosure described in Summary should be interpreted based on the description in Summary, and the example is only a specific example of the disclosure described in Summary.

Although the mode for carrying out the disclosure has been described above in connection with the example, the disclosure is not limited to the example, and can be of course carried out in various forms without departing from the spirit and scope of the disclosure.

The disclosure is usable in a manufacturing industry of a vehicle.

What is claimed is:
1. A control device for a vehicle, the vehicle including
a motor for traveling,
a high voltage battery connected to the motor through a high voltage system power line,
a charger connected to the high voltage system power line, the charger being configured to charge the high voltage battery using electric power from an external power supply,
a low voltage battery connected to a low voltage system power line,
a first DC-DC converter connected to the high voltage system power line and the low voltage system power line, the first DC-DC converter configured to decrease a voltage of the high voltage system power line and to supply the electric power of the high voltage system power line to the low voltage system power line, and
a second DC-DC converter connected to the high voltage system power line closer to the charger than the first DC-DC converter and the low voltage system power line, the second DC-DC converter configured to decrease a voltage of the high voltage system power line and to supply electric power of the high voltage system power line to the low voltage system power line,
the control device comprising
an electronic control unit configured to
  i) control the charger such that an power storage ratio of the high voltage battery becomes a target ratio when the charger performs external charging for charging the high voltage battery using the electric power from the external power supply, and
  ii) end the external charging when predetermined time has elapsed from the start of the external charging and when electric power from the external power supply is equal to or less than predetermined electric power.

2. The control device according to claim 1,
wherein the predetermined electric power is equal to or larger 800 W.

3. A control method for a vehicle, the vehicle including
a motor for traveling,
a high voltage battery connected to the motor through a high voltage system power line,
a charger connected to the high voltage system power line, the charger being configured to charge the high voltage battery using electric power from an external power supply,
a low voltage battery connected to a low voltage system power line,
a first DC-DC converter connected to the high voltage system power line and the low voltage system power line, the first DC-DC converter configured to decrease a voltage of the high voltage system power line and to supply the electric power of the high voltage system power line to the low voltage system power line,
a second DC-DC converter connected to the high voltage system power line closer to the charger than the first DC-DC converter and the low voltage system power line, the second DC-DC converter configured to decrease a voltage of the high voltage system power line and to supply electric power of the high voltage system power line to the low voltage system power line, and
an electronic control unit,
the control method comprising
  i) controlling the charger by the electronic control unit such that an power storage ratio of the high voltage battery becomes a target ratio when the charger performs external charging for charging the high voltage battery using electric power from the external power supply, and ii) ending the external charging by the electronic control unit when a predetermined time has elapsed from the start of the external charging and when electric power from the external power supply is equal to or less than a predetermined electric power.

* * * * *

UNITED STATES PATENT AND TRADEMARK OFFICE
CERTIFICATE OF CORRECTION

PATENT NO. : 10,099,571 B2
APPLICATION NO. : 15/463694
DATED : October 16, 2018
INVENTOR(S) : Fumiyoshi Kuribara and Shigetaka Asano It is certified that error appears in the above-identified patent and that said Letters Patent is hereby corrected as shown below:

In the Claims

In Column 8, Claim 2, Line 35, after "larger", insert --than--.

Signed and Sealed this
Eighth Day of January, 2019

Andrei Iancu
*Director of the United States Patent and Trademark Office*